Dec. 4, 1923.
O. DOMMER
1,476,601
METHOD OF AND APPARATUS FOR DETERMINING THE HEAT VALUE OF GASES
Filed Feb. 17, 1921
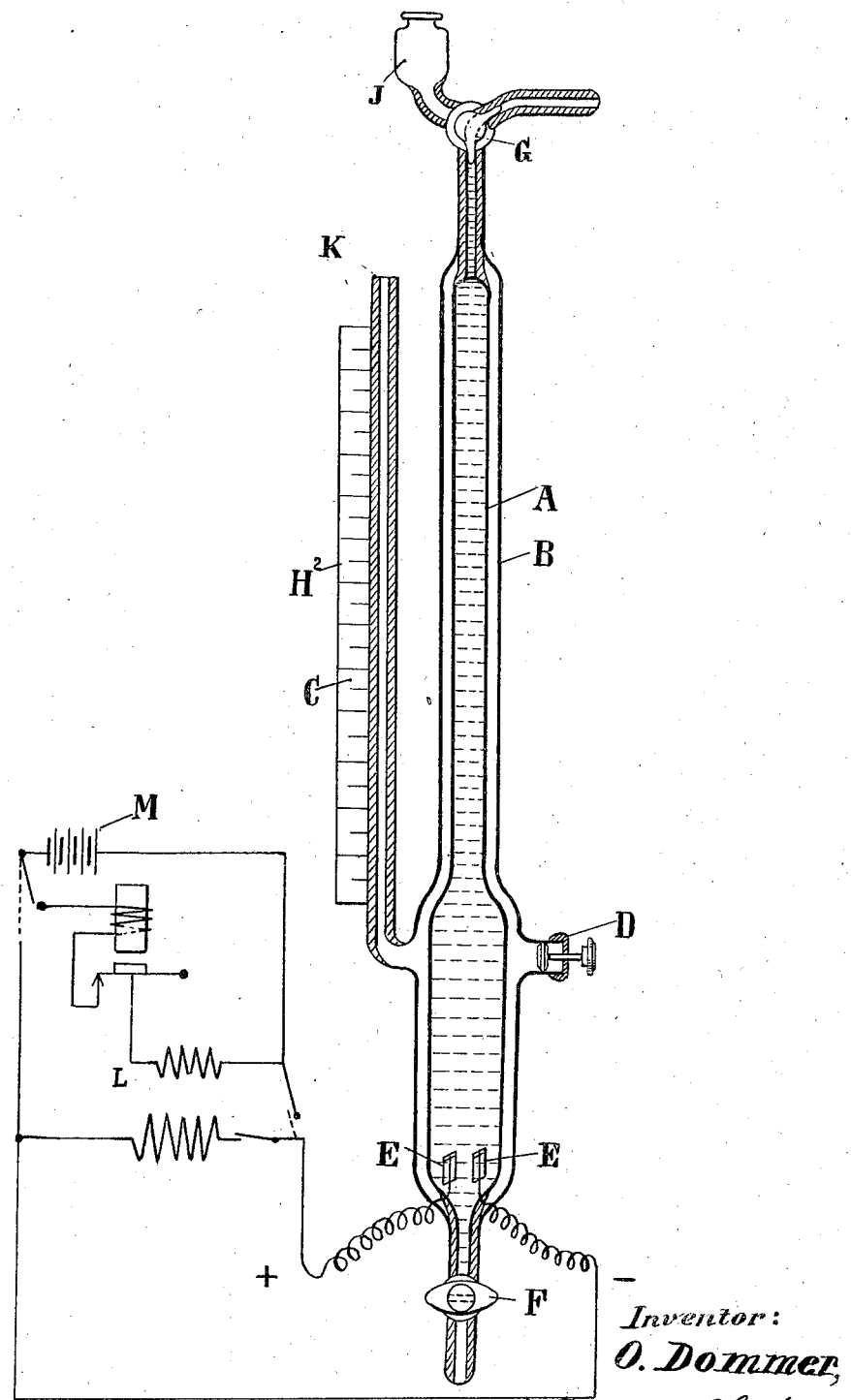
Inventor:
O. Dommer,
By Marks Clerk
Attys.

Patented Dec. 4, 1923.

1,476,601

UNITED STATES PATENT OFFICE.

OTTO DOMMER, OF KARLSRUHE, BADEN, GERMANY.

METHOD OF AND APPARATUS FOR DETERMINING THE HEAT VALUE OF GASES.

Application filed February 17, 1921. Serial No. 445,912.

*To all whom it may concern:*

Be it known that I, OTTO DOMMER, a citizen of the German Republic, residing at Karlsruhe, Baden (whose post-office address is 16 Weltzienstrasse, Karlsruhe, Baden, Germany), have invented certain new and useful Improvements in the Methods of and Apparatus for Determining the Heat Value of Gases, of which the following is a specification.

My invention relates to improvements in the method of and apparatus for determining the heat value of gases, and the object of the improvements is to provide a method and an apparatus which are simple in operation and give accurate results. With these and other objects in view my invention consists in the matters to be described hereinafter and particularly pointed out in the appended claims.

For the purpose of explaining the invention an example embodying the same has been described hereinafter, reference being had to the accompanying drawing showing a vertical longitudinal section of a preferred apparatus for putting the method into effect.

The determination of the heat value of gases is effected in a known manner in an explosion burette which is provided at top and bottom with cocks and is surrounded by a jacket, and has two electrodes extending into it.

The improved process is based on the principle that the measurement and combustion of the standard gas and of the gas to be tested, as well as the generation of the hydrogen, serving as the standard gas, is effected in one and the same chamber in the lower part of which the electrodes are situated, and thus the amount of heat generated by the combustion is absorbed by the liquid having a great coefficient of expansion situated in the jacket, and its expansion is measured. Since the determinations are made under the same conditions of pressure, temperature and hydrogen-saturation, these features are eliminated, and the upper heat value of the dry gas reduced to normal conditions, is obtained without further correction.

The improved apparatus for carrying the improved process into effect consists in the usual manner of the burette A which is contracted at its upper part for the purpose of increasing the accuracy of the reading, and is provided with cocks F and G and a vessel J. Around the burette A there is arranged in a known manner a jacket B which is provided with a reading tube K and a charging aperture D with a movable plug. The space between A and B is filled with a water-clear liquid having a high coefficient of expansion. Into the lower part of the burette A there are inserted electrodes which allow on the one hand of igniting the test gas that has been measured into the burette and mixed with air, by means of an induction coil L and an electric battery M shown in a conventional way, and on the other hand, when the induction coil is disconnected, allow of generating the standard hydrogen by electrolysis, which hydrogen is then diluted with air and then burned like the test gas, and which electrodes allow of the generation of oxy-hydrogen gas in the case of such gases which are examined and which give a bad combustible mixture with air alone.

The amount of heat freed by the explosion is transferred to the liquid between A and B whose expansion is read-off the tube K by means of the scale C.

The improved process is carried into effect in the following simple manner:—

The burette A is filled through the cock F by means of a "level-vessel" with acidulated water, and oxy-hydrogen gas is allowed to be formed. Then a determined quantity of it is measured off, and air is allowed to enter until the burette A is quite free from water. Then the cocks are closed, the mixture is exploded, and the expansion-distance is read-off at K. Then the burette is again filled and the same quantity of test gas as was taken of hydrogen, is measured off and mixed with air. After the explosion a reading is taken. Since the heat value of hydrogen is known, that is to say, is equal to 3050 heat units per cub. metre, the heat value of the test gas is obtained as the quotient of expansion-distance of the test gas multiplied by 3050 divided by the expansion-distance of $H_2$.

*Example.*

Generated oxy-hydrogen gas 30 cub. cm......... 20.0 cub. cm. $H_2$
Expansion-distance on explosion................ 6.2 mm.
Amount of charge of test gas..................... 20.0 cum. cm.
Expansion-distance on explosion ................ 10.6 mm.
Heat value of the gas per cub. metre of dry gas at 7.60 mm. pressure and 0° C.:

$$\frac{10.6 \times 3050}{6.2} = 5215 \text{ heat units.}$$

I claim:

1. The herein described method of determining the heat value of gases, which consists in generating a standard gas within a container, successively causing combustion of the standard gas and the gas to be tested within the said container, and separately measuring the heat set free by the combustion.

2. The herein described method of determining the heat value of gases, which consists in electrically generating a standard gas within a container, causing combustion of the standard gas, measuring the heat set free by the combustion, electrically generating oxyhydrogen within the container, supplying the gas to be tested to the container, causing combustion by the oxyhydrogen of the gas to be tested, and measuring the heat set free by the combustion.

3. The herein described method of determining the heat value of gases, which consists in causing combustion of a standard gas within a container, measuring the heat set free by the combustion, electrically generating oxyhydrogen within the container, supplying the gas to be tested to the container, causing combustion by the oxyhydrogen of the gas to be tested, and measuring the heat set free by the combustion.

4. In apparatus for determining the heat value of gases, comprising a container for the standard gas and the gas to be tested, electrodes within said container, means to supply electric energy to said electrodes suitable for electro-chemical action, within the container, and means to measure the heat set free within the container.

5. In apparatus for determining the heat value of gases, comprising a container for the standard gas and the gas to be tested, electrodes within said container, means to supply electric energy to said electrodes suitable for electro-chemical action, means to supply electric energy to said electrodes sufficient to ignite the gas within the container, and means to measure the heat set free within the container.

In testimony whereof I hereunto affix my signature in the presence of two witnesses.

OTTO DOMMER.

Witnesses:
M. NEAL GINLAD,
EMMA REHM.